(12) United States Patent
Tsudaka

(10) Patent No.: US 7,796,636 B2
(45) Date of Patent: Sep. 14, 2010

(54) TDMA COMMUNICATION APPARATUS

(75) Inventor: Kentaro Tsudaka, Nishinomiya (JP)

(73) Assignee: Furuno Electric Company, Limited, Hyogo-ken (JP)

( * ) Notice: Subject to any disclaimer, the term of this patent is extended or adjusted under 35 U.S.C. 154(b) by 178 days.

(21) Appl. No.: 11/887,965

(22) PCT Filed: Apr. 6, 2006

(86) PCT No.: PCT/JP2006/307365

§ 371 (c)(1),
(2), (4) Date: Feb. 20, 2008

(87) PCT Pub. No.: WO2006/109689

PCT Pub. Date: Oct. 19, 2006

(65) Prior Publication Data

US 2009/0028175 A1 Jan. 29, 2009

(30) Foreign Application Priority Data

Apr. 7, 2005 (JP) .............................. 2005-111170

(51) Int. Cl.
*H04J 3/00* (2006.01)
(52) U.S. Cl. ..................................... 370/443
(58) Field of Classification Search .................. 370/443, 370/337
See application file for complete search history.

(56) References Cited

U.S. PATENT DOCUMENTS

| | | | | |
|---|---|---|---|---|
| 5,199,031 | A * | 3/1993 | Dahlin | 370/329 |
| 6,469,997 | B1 * | 10/2002 | Dorenbosch et al. | 370/337 |
| 6,522,307 | B2 * | 2/2003 | Kim | 343/850 |
| 6,674,750 | B1 * | 1/2004 | Castellano | 370/354 |
| 6,907,013 | B1 * | 6/2005 | Ruziak | 370/277 |
| 7,016,316 | B2 * | 3/2006 | Stobart | 370/278 |
| 7,047,114 | B1 * | 5/2006 | Rogers | 701/21 |
| 2002/0163899 | A1 * | 11/2002 | Liu | 370/337 |

FOREIGN PATENT DOCUMENTS

| | | |
|---|---|---|
| JP | 11-239152 | 8/1999 |
| JP | 11-326511 A | 11/1999 |
| JP | 2001-094447 A | 4/2001 |
| JP | 2003-218820 A | 7/2003 |

OTHER PUBLICATIONS

ITU-R M.1371, "Technical Characteristics for a Universal Shipborne Automatic Indentification System Using Time Division Multiple Access in the VHF Maritime Mobile Band", IMO MSC 69 Recommondation on Performance Standards for a Universal Shipborne AIS, 1998.

* cited by examiner

*Primary Examiner*—Ricky Ngo
*Assistant Examiner*—Rasheed Gidado
(74) *Attorney, Agent, or Firm*—Birch, Stewart, Kolasch & Birch, LLP

(57) ABSTRACT

A TDMA communication apparatus is configured for transmitting DSC response signals while preventing overlapping with AIS. A CPU 1 computes the DSC transmission time length $T_{dsc}$ of a DSC response command (S11) and detects the present time $t_0$ (S12). CPU 1 computes an AIS transmission standby time length $T_{aistx}$ and compares it with the DSC transmission time length $T_{dsc}$ (S13 to S14). Next, if the DSC transmission time length $T_{dsc}$ is shorter, CPU 1 computes an AIS reception standby time length $T_{aisrx}$ and compares it with the DSC transmission time length $T_{dsc}$ (S15 to S16). If the DSC transmission time length $T_{dsc}$ is shorter, CPU 1 effectuates transmission control (S17).

8 Claims, 17 Drawing Sheets

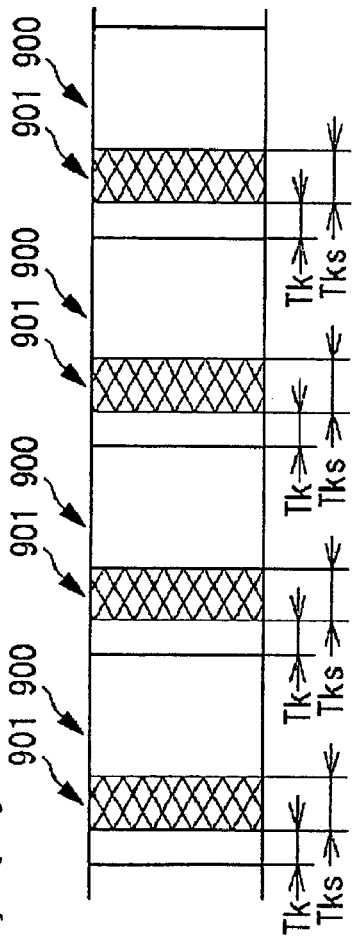
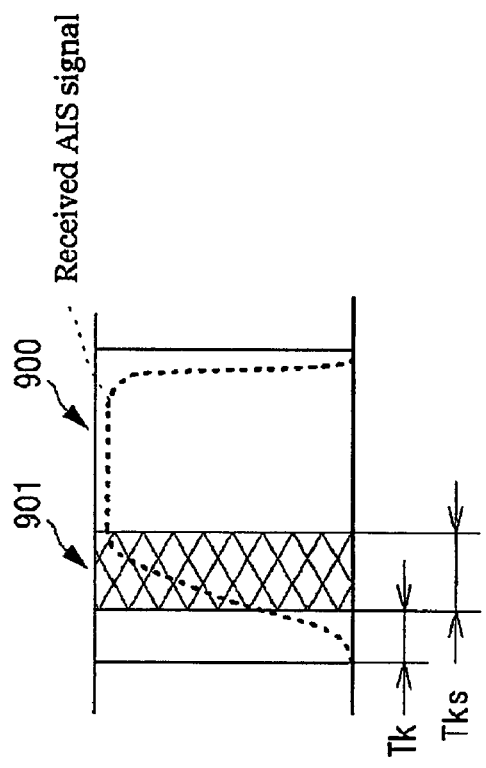

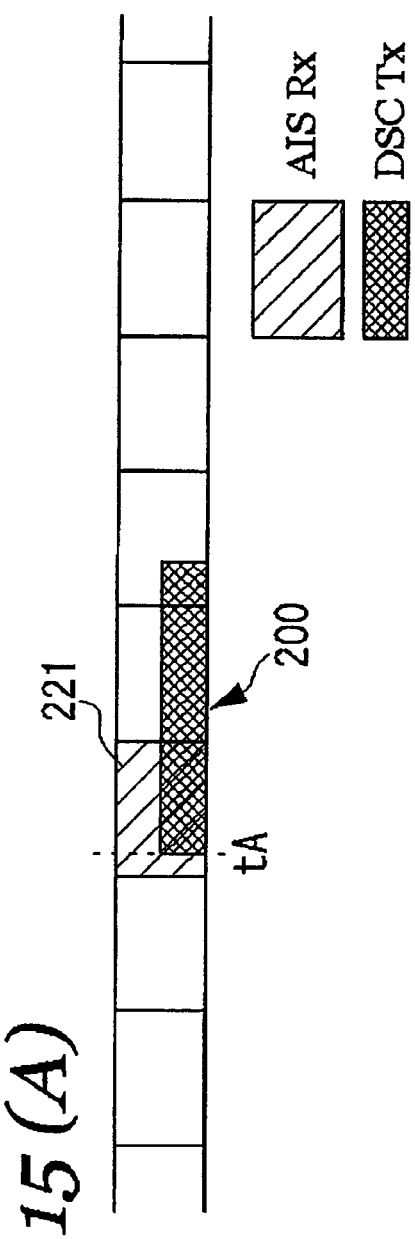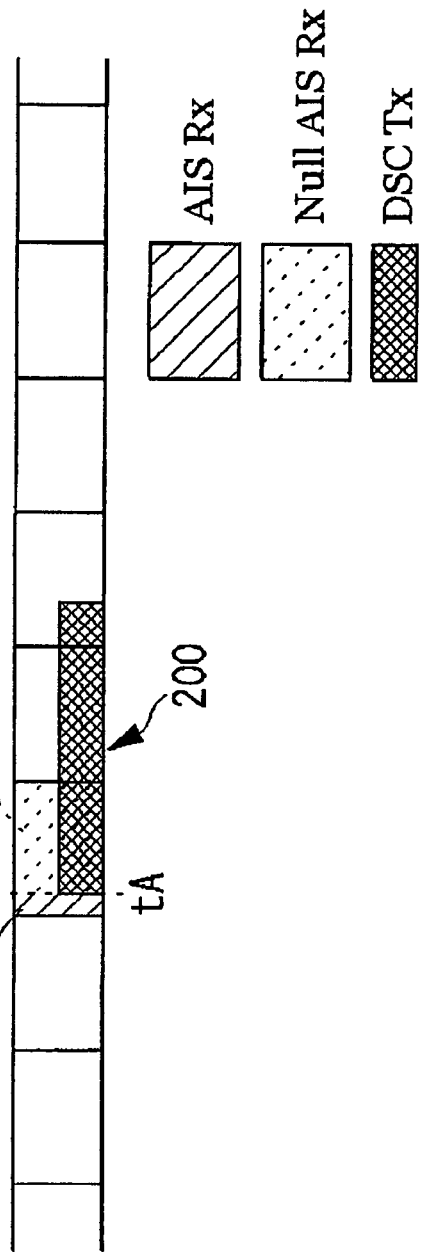

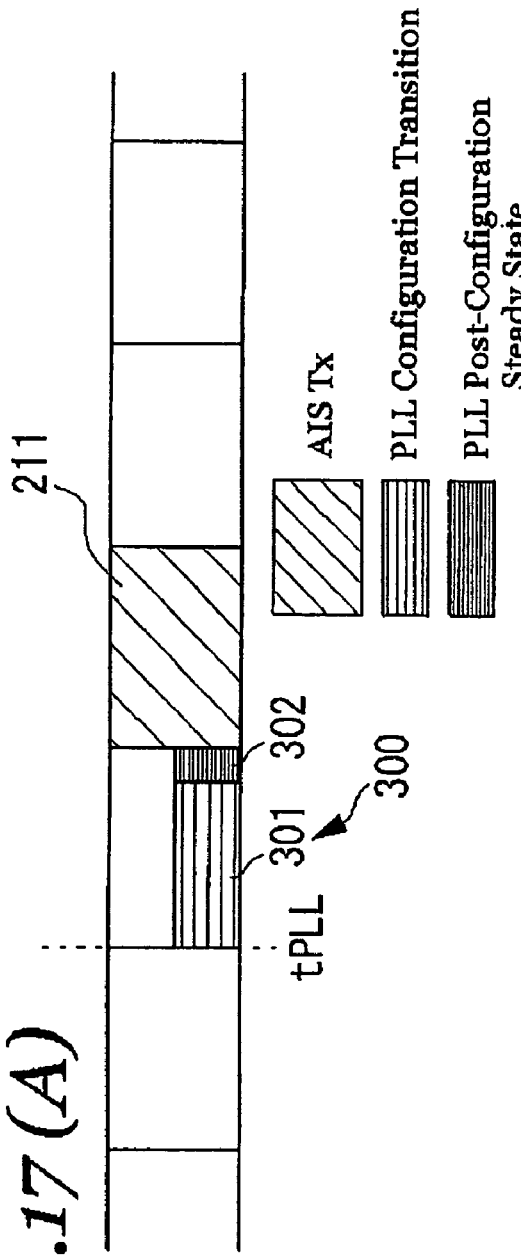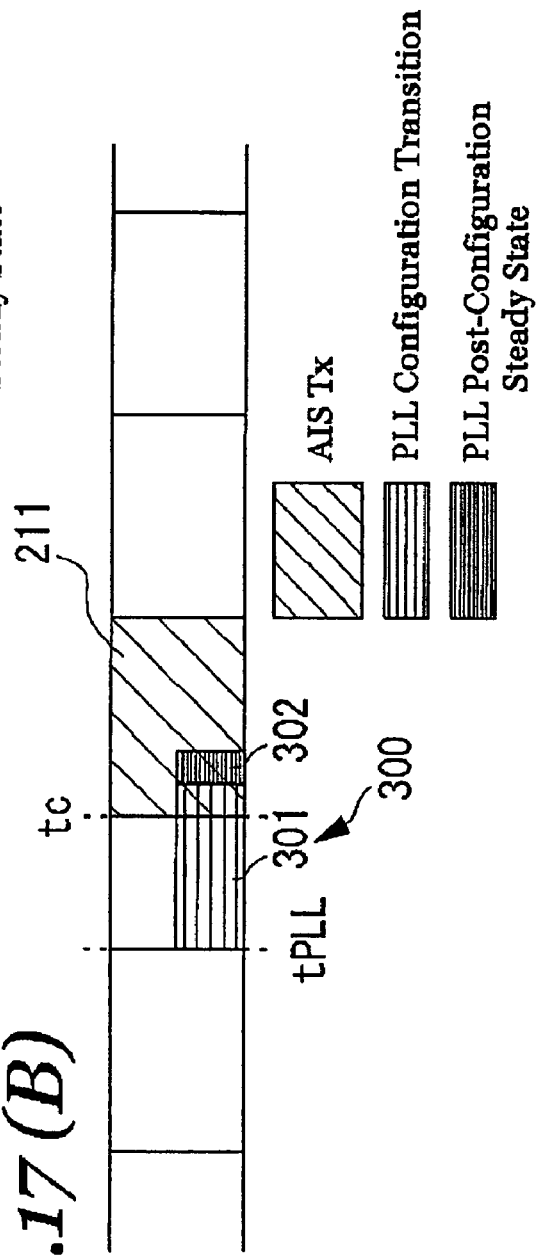

US 7,796,636 B2

TDMA COMMUNICATION APPARATUS

CROSS REFERENCE OF RELATED APPLICATION

Japanese Patent Application Tokugan No. 2005-111170 and PCT Patent Application JP/JP2006/307365 (WO 2006/109689 A1) are hereby incorporated by reference.

TECHNICAL FIELD

This invention relates to a TDMA communication apparatus that communicates AIS (Automatic Identification System) information signals in TDMA mode and, in particular, to a TDMA communication apparatus that performs communications using AIS and DSC (Digital Selective Calls).

BACKGROUND ART

Communications systems operating in SOTDMA (Self Organizing Time Division Multiple Access) mode are presently employed in the Universal Automatic Identification System (referred to herein as UAIS) systems, which are used for ensuring the safety of marine vessel navigation. Such UAIS systems mostly transmit and receive digital data of their own and from other stations as AIS messages (e.g. see Patent Document 1).

In such UAIS systems, all marine vessels etc. are divided into respective predetermined classes (Classes), with different communication rules set up for different classes. For instance, in Class A, which comprises large vessels etc., AIS messages are transmitted and received in the above-mentioned SOTDMA mode. In Class B, which comprises small vessels etc., AIS messages are transmitted and received so as not to prevent transmissions and receipts in Class A.

FIG. 13 is a schematic diagram illustrating TDMA communications between a base station and a vessel utilizing the UAIS.

Land Base Station, 100, and Mobile Stations 101, 102, which are located on vessels, are respectively equipped with AIS Communication Apparatuses 110, 111, and 112, and perform slot synchronization based on Universal Time, Coordinated or Coordinated Universal Time (UTC) obtained from separately provided GPS devices, as well as the time from a station serving as a specific reference.

In the UAIS, any station, upon receipt of an AIS message from another station, detects the next reserved slot of the corresponding station and stores it in a slot map. All stations participating in the UAIS system are separately provided with such slot maps, their contents being common to all the stations. The stations then effect transmission in accordance with the reserved slots stored in the slot maps. This makes it possible to prevent overlapping of the transmission slots of various stations.

Moreover, in the UAIS, DSC commands that have the same frequency band but different frequencies, modulation/demodulation techniques, and transmission rates are used separately from the AIS messages. The DSC commands, which are messages used by stations controlling base stations, coastal stations, etc. to manage the transmission and reception frequencies of AIS communication signals and vessel positions, etc., are transmitted from the controlling stations to the other stations in the system. Stations, to which they are sent, transmit DSC response signals in response to the received DSC commands. Therefore, in addition to AIS transceiver sections, stations employing the above-described UAIS are equipped with DSC transceiver sections.

While every station in a UAIS system typically has an AIS receiving section and a DSC receiving section provided separately from each other, since the frequency band is the same, the station has a shared transmitting section, which transmits both AIS communication signals and DSC response signals. In other words, a UAIS station transmits AIS signals and DSC response signals by switching between different transmission frequencies and modulation techniques during transmission. Furthermore, because of cost and equipment-related considerations, the same piece of equipment is typically used both as a transmitting antenna and as a receiving antenna. For this reason, in every station, UAIS system-based communications are implemented by switching between receipt of AIS communications and DSC communications (DSC commands), transmission of AIS communications, and transmission of DSC communications (response signals).

DSC communications, which include communicating DSC commands and DSC response signals, are different from AIS communications, which involve communicating AIS messages, and are not slot-synchronized.

Patent Document 1: JP 2003-218820A.

DISCLOSURE OF INVENTION

Problem to be Solved by the Invention

However, due to a UAIS rule governing the transmission of DSC response signals, which stipulates that it "must not affect the transmission and receipt of AIS signals", DSC transmissions must be stopped when the transmission and receipt of AIS communications overlaps with the DSC transmissions.

FIG. 14 is a schematic diagram illustrating a situation, wherein slots reserved for AIS communications overlap during a DSC transmission. In FIG. 14, $t_0$ designates the present time, 200 DSC Transmission Time Domain, and 211 AIS Transmission Time Domain (slot). In addition, 201 designates Actual DSC Transmission Time Domain, wherein an actual DSC transmission is carried out, and 202 Null DSC Transmission Time Domain, wherein no actual DSC transmission is performed.

Conventionally, if there are neither AIS transmission nor AIS reception reservations for the slot corresponding to the present time $t_0$, all the stations, i.e. TDMA communication apparatuses, carry out DSC transmission regardless of the time length of the DSC response signals. However, as shown in FIG. 14 (A), depending on the amount of data in a DSC response command, a DSC transmission may start from the present time $t_0$ and may not be finished by start timing of the next AIS transmission slot. In such a case, in accordance with the above-described rule, the TDMA communication apparatus suspends the DSC transmission and proceeds with an AIS transmission. For this reason, the DSC response command ends up being cut off midway through transmission, and while response commands corresponding to Actual DSC Transmission Time Domain 201 are transmitted, response commands corresponding to Null DSC Transmission Time Domain 202 are not transmitted (Problem 1).

In addition, in the UAIS, an AIS message is sometimes transmitted without making transmission reservations. When such a transmission is performed, a TDMA communication apparatus must receive the AIS message. For this reason, TDMA communication apparatuses normally have their receiving sections set to a reception-ready state.

FIG. 15 is a schematic diagram illustrating a situation, in which unscheduled AIS reception is carried out when an attempt to initiate a DSC transmission is being made. In FIG.

15, $t_A$ stands for the time of a scheduled DSC transmission, 200 for DSC Transmission Time Domain, and 221 for AIS Reception Time Domain (slot). Moreover, key 222 designates AIS Reception-free Time Domain, in which no actual AIS reception is performed.

As shown in FIG. 15, when the TDMA communication apparatus starts compilation to perform a DSC transmission and an AIS communication signal is received suddenly, without a reservation, the TDMA communication apparatus receives the AIS communication signal. Because the TDMA communication apparatus cannot transmit and receive simultaneously, even if unscheduled AIS reception is underway in AIS Reception Domain 221, upon arrival of time $t_A$, at which a DSC transmission is supposed to start, the DSC transmission starts and the AIS reception is suspended (AIS Reception-free Domain 222). For this reason, this situation ends up violating the rule that "DSC transmission must not interfere with AIS transmission and reception" (Problem 2).

Moreover, two channels, i.e. CH A and CH B, are currently used for AIS communications in the UAIS, with each TDMA communication apparatus being equipped with slot maps corresponding to the respective channels. A UAIS uses such slot maps to carry out transmission management and it is stipulated that transmission reservations cannot be made by the same TDMA communication apparatus in the back slots (CH B with respect to CH A) and adjacent slots of slots that have been reserved for transmission in advance.

The following problems arise as a result of such a rule.

FIG. 16 is a schematic diagram illustrating a situation, in which transmission becomes impossible due to overlapping of AIS transmission reservations at the same station. In FIG. 16, 16(A), 16(B), and 16(C) are arranged along a time line.

As shown in FIG. 16(A), when an AIS transmission reservation for Slot NA (SlotNA) is transmitted as a DSC command from a base station X at time $t_1$, the corresponding TDMA communication apparatus analyzes it and stores Slot NA (SlotNA) as AIS Transmission Slot 211 in the slot map. At such time, Slot NB, which is a back slot with respect to Slot NA, as well as slots adjacent to these slots, turn into prohibited domains (slots) for the TDMA communication apparatus.

Next, as shown in FIG. 16(B), when an AIS transmission reservation for Slot NB (SlotNB) is transmitted to the same TDMA communication apparatus as a DSC command from a base station Y at time $t_2$, said TDMA communication apparatus analyzes it and attempts to make a reservation in the slot map. However, the TDMA communication apparatus cancels this reservation because Slot NB is a prohibited slot.

Here, if a command prohibiting transmission in Slot NA is inputted to the TDMA communication apparatus between time $t_2$ and time $t_3$, the TDMA communication apparatus suspends transmission in Slot NA, cancels the transmission reservation and updates the slot map.

Then, as shown in FIG. 16(C), when time $t_3$, which immediately precedes Slot NA and Slot NB, arrives and the TDMA communication apparatus reads the slot map, it performs no AIS transmission because transmission reservations in Slot NA and Slot NB have been canceled.

When such processing is performed, the base station Y considers the previously cancelled transmission reservation made by the base station Y in Slot NB to have been ignored by the TDMA communication apparatus (Problem 3).

Moreover, AIS communications have to be synchronized with slot timing in the above-described manner, as a result of which the operation of the Phase-Locked Loop (PLL) of the transmitting section has to be stabilized in advance. For this reason, a conventional TDMA communication apparatus back-calculates the time to stabilization of PLL oscillation from the start timing of the transmission slot and starts the PLL by adding a certain margin.

However, conventional PLL starting methods give rise to the following problems.

FIG. 17 is a schematic diagram illustrating a relationship between the PLL startup timing and a slot reserved for transmission.

Typically, a TDMA communication apparatus sets the PLL startup time $t_{PLL}$ with reference to the slot start timing of AIS Transmission Slot 211 using PLL Startup Time 300, which is obtained by adding PLL Post-configuration Stabilization Time 302 to PLL Configuration Transition Time 301 (see 17A). Because in this case the PLL oscillates in a stable manner, in AIS Transmission Slot 211, the TDMA communication apparatus can transmit AIS messages in accordance with the configured frequency.

Incidentally, because TDMA communication apparatuses, as described above, synchronize slot timing using UTC etc. at some point in time, as a result of fine-tuning the synchronized timing $t_c$, the synchronized timing $t_c$ sometimes moves to an earlier time and the slot length becomes shorter. And when the slot length (slot duration) of the slot immediately preceding the slot timing is shortened by the synchronization, the slot start timing of AIS Transmission Slot 211 ends up invading PLL Configuration Transition Time 301. In such a case, the TDMA communication apparatus ends up transmitting AIS messages while the frequency is still unstable (Problem 4).

Therefore, it is an object of the invention to construct a TDMA communication apparatus which, along with preventing the overlapping of AIS and DSC, is capable of efficiently and accurately transmitting AIS messages and DSC response commands.

Means for Solving Problem

The present invention is a TDMA communication apparatus that, by allocating a plurality of slots to a single frame in a time-divided manner, effects transmission of a first communication signal during slots reserved by communicating stations by performing respective slot synchronization and, along with that, effects transmission of a second communication signal without the slot synchronization being performed, wherein the apparatus comprises: a reserved slot storage unit that stores reserved slots for each of the stations, and a control unit that, along with computing a transmission time length for the second communication signal being transmitted, computes a standby time length from the present time until the time of receipt of the first communication signal or the time of transmission of the next first communication signal read from the reserved slot storage unit and effects transmission control over the second communication signal if the transmission time length is detected to be shorter than the standby time length.

In this arrangement, the control unit of the TDMA communication apparatus, along with computing the transmission time length of the second communication signal, reads transmission reservations and reception reservations for the first communication signal stored in the reserved slot storage unit. The control unit then computes, as a standby time length, the time to the slot start timing of the slot reserved for transmission or slot reserved for reception that is closest to the present time. If the transmission time length of the second communication signal is shorter than the standby time length, the control unit makes a determination that the second communication signal can be transmitted in its entirety and effects transmission control over the second communication signal.

As a result, the transmission and receipt of the first communication signal is not impaired by the transmission of the second communication signal.

Moreover, the inventive TDMA communication apparatus includes a receipt detection unit that detects receipt of the first communication signal, in which the control unit effects transmission control over the second communication signal when it is determined that the receipt detection unit has not detected receipt of the first communication signal.

In this arrangement, the control unit effects transmission control over the second communication signal when it is detected that the first communication signal has not been received by the receipt detection unit. As a result, the control unit does not effect transmission control over the second communication signal if a first communication signal is received without a reservation and effects transmission control over the second communication signal only if the first communication signal has not been received. As a result, transmission control over the second communication signal is not impaired by the receipt of an unscheduled first communication signal.

Moreover, the inventive TDMA communication apparatus is characterized in that receipt is detected by the receipt detection unit using timing delayed from the slot start timing by a predetermined time within the same slot.

In this arrangement, the receipt detection unit detects receipt not at the slot start timing, but at a time delayed by a predetermined time from the slot start timing. Typically, the transmission and receipt of the first communication signal involves a certain rise time for the communication signal, whose amplitude cannot reach the default setting immediately. Accordingly, as a result of shifting the timing of receipt detection from the slot start timing in the direction of delay, receipt detection is performed at a point in time, at which the amplitude of the first communication signal is large. This improves the receipt detection capability.

Moreover, the inventive TDMA communication apparatus includes an overlapping reserved slot storage unit that stores slots as overlapping reserved slots when the present station's transmission is subject to reservation by other stations and, at the time when compilation starts for the overlapping reserved slots, the control unit selects signals transmitted during the overlapping reserved slots based on information from the overlapping reserved slot storage unit.

In this arrangement, when transmission reservations are made for a station by multiple other stations (base stations), the control unit does not store the transmission reservations in the reserved slot storage unit, but stores the contents of the transmission reservations in the overlapping reserved slot storage unit. Then, upon receipt of information prescribing suspension or prohibition of transmission, the control unit stores this information as well. When the start timing of the corresponding slot approaches and compilation for the slot starts, the control unit uses overlapping slot information from the overlapping reserved slot storage unit to select the signal transmitted during the slot based on predetermined conditions (e.g. not subject to suspension of transmission, reserved at the earliest time) and stores it in the reserved slot storage unit. As a result, when suspension of transmission is prescribed for an overlapping reserved slot, the transmission reservation that is not subject to the suspension of transmission prescribed for said slot is carried out.

In addition, in the inventive TDMA communication apparatus, the control unit effects operation initiation control over the transmission reference frequency generation unit using a slot start timing moved back by a predetermined number of slots and the oscillation stabilization time of the transmission reference frequency generation unit from the transmission start timing of the first communication signal and second communication signal.

In this arrangement, the control unit effects operation initiation control over the transmission reference frequency generation unit in a situation wherein, in addition to the oscillation stabilization time, i.e. the time to stabilization of oscillation, there is a steady-state time lasting a predetermined number of slots. As a result, even if slot synchronization is performed and the time to the transmission slot becomes shorter, the oscillation stabilization time does not reach the slot start timing of the transmission slot. In other words, stable oscillation takes place at the slot start timing of the transmission slot. Accordingly, at the slot start timing of the transmission slot, the transmission reference frequency generation unit operates in a stable manner.

In addition, the inventive TDMA communication apparatus uses AIS signals as the first communication signal and DSC signals as the second communication signal.

In this arrangement, AIS signals and DSC signals, respectively, are utilized as specific examples of use of the first communication signal and second communication signal.

Effects of the Invention

In accordance with the present invention, the first communication signal, which is transmitted with slot synchronization, and second communication signal, which is transmitted without slot synchronization, can be transmitted without conflicts.

Moreover, in accordance with the present invention, impairment to the transmission of the second communication signal due to the receipt of the first communication signal performed without a reservation can be prevented because transmission control over the second communication signal is effected upon detection of the state of receipt of the first communication signal.

Moreover, in accordance with the present invention, detection of receipt of the first communication signal can be reliably executed and impairment to the transmission of the second communication signal can be reliably prevented as a result of delaying the receipt detection timing of the first communication signal by a predetermined time from the slot start timing.

Moreover, in accordance with the present invention, even in a situation where slots reserved for transmission overlap, when suspension of transmission is prescribed for any of the overlapping reserved slots up to the time of the transmission slot, storing information on overlapping slots makes it possible to execute transmission by discarding transmission reservation of that slot and using another transmission reservation.

Moreover, in accordance with the present invention, transmission failures due to instability of the oscillator frequency can be prevented and transmission can be executed in a reliable manner because transmission is performed in a state, wherein the transmission reference frequency has been reliably stabilized.

In particular, in accordance with the present invention, conflicts between transmission of AIS communication signals and that of DSC communication signals can be reliably avoided and the respective communication signals can be transmitted in a reliable manner.

BRIEF DESCRIPTION OF DRAWINGS

FIG. 7 is a schematic diagram illustrating carrier sense timing.

FIG. 15 is a schematic diagram illustrating unscheduled AIS reception carried out at the time of an attempt to initiate DSC transmission.

FIG. 17 is a schematic diagram illustrating a relationship between PLL startup timing and a slot reserved for transmission.

DESCRIPTION OF REFERENCE NUMERALS

1. CPU
2. Transmitter.
21. Transmission Reference Frequency Generation Circuit.
3. Transmit/Receive Switch.
4. DSC Receiver.
41. DSC Carrier Detection Circuit.
5,6. AIS Receivers.
51,61. AIS Carrier Detection Circuits.
7. GPS Receiver.
8. Slot Pulse Generation Circuit.
9. Memory.
11. VHF Antenna.
12. GPS Antenna.
91. Slot Map.
92. Overlapping Slot Memory.
93. Compilation/Analysis Memory.

BEST MODE FOR CARRYING OUT THE INVENTION

A TDMA communication apparatus used in an embodiment of the present invention will be now explained with reference to FIG. 1 to FIG. 12. It should be noted that an AIS apparatus installed on a vessel is used as an example of the TDMA communication apparatus.

Figure 1:
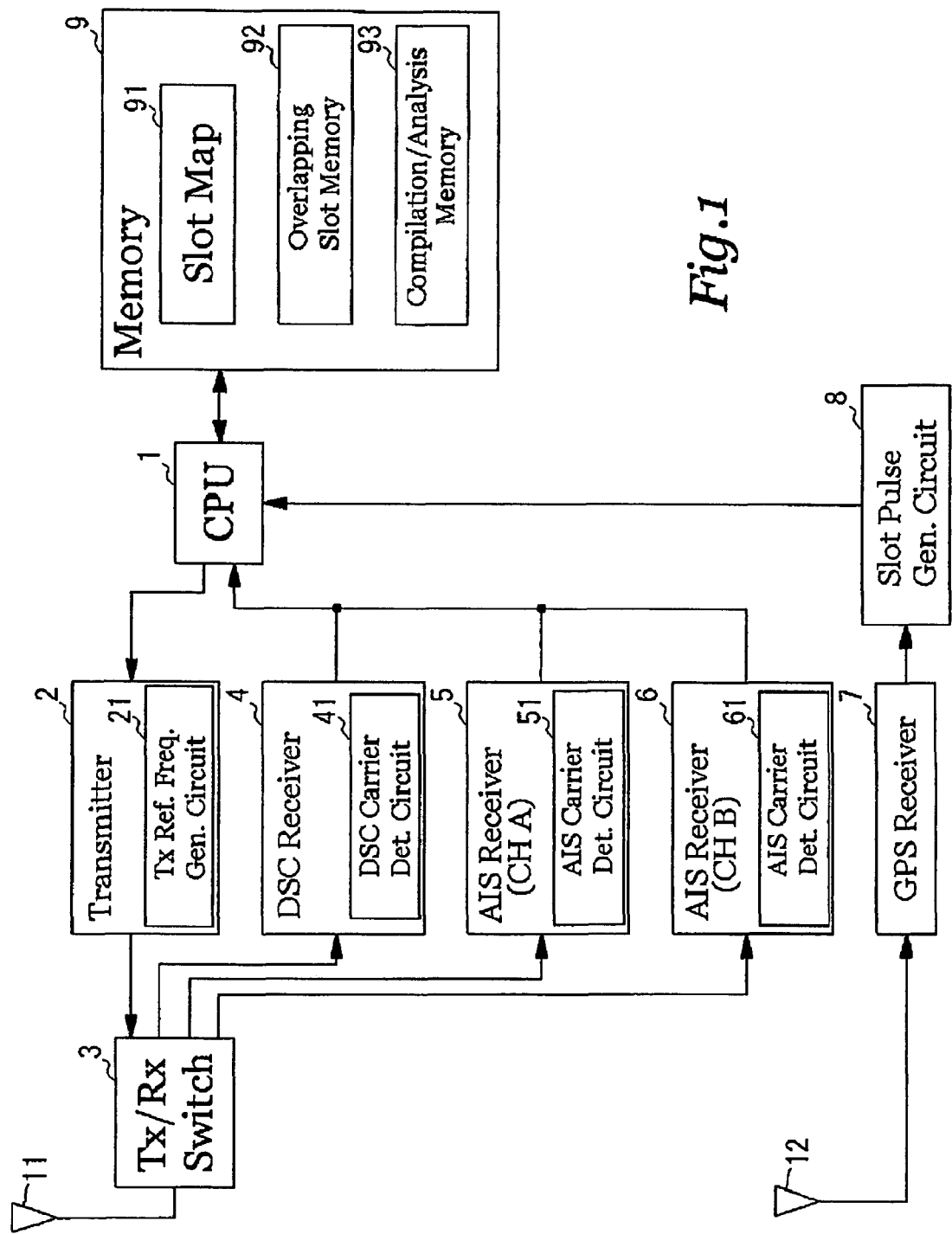
FIG. 1 is a block diagram illustrating a schematic configuration of an AIS apparatus used in an embodiment of the present invention.

FIG. 1 is a block diagram illustrating a schematic configuration of the AIS apparatus of the present embodiment.

The AIS apparatus of the present embodiment includes CPU 1, Transmitter 2, Transmit/Receive Switch 3, DSC Receiver 4, AIS Receivers 5 and 6, GPS Receiver 7, Slot Pulse Generation Circuit 8, and Memory 9.

CPU 1 exercises control over the entire AIS apparatus. CPU 1 uses Compilation/Analysis Memory 93 to analyze DSC commands from base stations and AIS messages from base stations and other vessels received by DSC Receiver 4 and AIS Receivers 5, 6. Based on the results of the analysis, CPU 1 performs storage and updating operations on reserved slots in Slot Map 91 of Memory 9 and, if there are overlapping slots, concurrently stores information on the overlapping slots in Overlapping Slot Memory 92. Moreover, CPU 1 compiles DSC response commands for base stations and uses Compilation/Analysis Memory 93 to compile AIS messages containing the next reserved slot and information on the vessel.

CPU 1 carries out slot synchronization based on a slot reference pulse obtained from Slot Pulse Generation Circuit 8. As used herein, the term "slot synchronization" refers to a control operation used to match slot start timing (hereinafter referred to as "slot timing"), i.e. reference time units (reference data units), during time-division communication performed by stationary stations such as base stations and mobile stations such as vessels, etc. participating in a UAIS system.

When an AIS message is transmitted, CPU 1 reads Slot Map 91 and Overlapping Slot Memory 92 of Memory 9 and exercises oscillation start control over Transmission Frequency Generation Circuit 21 by a hereinafter described method using the transmission slots of the present vessel as a reference. CPU 1 then forwards the AIS message to Transmitter 2 and, along with that, exercises AIS transmission timing control over Transmitter 2 based on the slot timing of the transmission slots of the present vessel.

Moreover, when a DSC response command is transmitted, CPU 1 uses a hereinafter described method to perform carrier sensing while reading Slot Map 91 and Overlapping Slot Memory 92. Then, if during a predetermined time period there is no transmission and receipt of AIS communication signals and if there is currently no reception underway, CPU 1 sends the DSC response command to Transmitter 2 and, along with that, exercises DSC transmission timing control by providing oscillation initiation control in Transmission Frequency Generation Circuit 21.

Transmitter 2 comprises Transmission Frequency Generation Circuit 21, with Transmission Frequency Generation Circuit 21 comprising a PLL circuit. Transmitter 2 carries out predetermined modulation by superimposing AIS messages or DSC response commands provided by CPU 1 on a carrier signal whose frequency is set by Transmission Frequency Generation Circuit 21 and outputs AIS communication signals or DSC communication signals based on transmission timing provided by CPU 1. More specifically, when an AIS message is transmitted, Transmitter 2, using Transmission Frequency Generation Circuit 21, generates a reference frequency signal for AIS transmission, set based on DSC commands etc. received from a base station. Transmitter 2 superimposes the AIS message on (modulates it with) the reference frequency signal and, after modulation in accordance with a predetermined modulation scheme, outputs it to Transmit/Receive Switch 3. On the other hand, when a DSC message is transmitted, Transmitter 2 uses Transmission Frequency Generation Circuit 21 to generate a reference frequency signal for DSC responses, set based on DSC commands etc. received from a base station. Transmitter 2 superimposes the DSC command on (modulates it with) the reference frequency signal and, after modulation in accordance with a predetermined modulation scheme, outputs it to Transmit/Receive Switch 3.

Transmit/Receive Switch 3 connects Transmitter 2, DSC Receiver 4, and AIS Receivers 5, 6 to VHF Antenna 11. Transmit/Receive Switch 3, along with outputting AIS communication signals and DSC communication signals continually received by VHF Antenna 11 to DSC Receiver 4 and AIS Receivers 5 and 6, outputs AIS communication signals and DSC communication signals outputted from Transmitter 2 to VHF Antenna 11.

DSC Receiver 4 comprises DSC Carrier Detection Circuit 41 and, upon detection of receipt of a DSC communication signal, said DSC Carrier Detection Circuit 41 detects the phase of the DSC communication signal, demodulates it, and outputs it to CPU 1.

AIS Receivers 5 and 6 receive AIS communication signals on different channels. In the embodiment of FIG. 1, Channel A (CH A) AIS communication signals are received by AIS Receivers 5 and Channel B (CH B) AIS communication signals are received by AIS Receivers 6.

AIS Receivers 5 comprises AIS Carrier Detection Circuit 51 and, upon detection of receipt of a Channel A AIS communication signal, AIS Carrier Detection Circuit 51 detects the phase of the AIS communication signal, demodulates it, and outputs it to CPU 1.

AIS Receivers 6 comprises AIS Carrier Detection Circuit 61 and, upon detection of receipt of a Channel B AIS communication signal, AIS Carrier Detection Circuit 61 detects the phase of the AIS communication signal, demodulates it, and outputs it to CPU 1.

GPS Receiver 7, which is connected to GPS Antenna 12, detects UTC time information from a GPS signal received by GPS Antenna 12 and outputs it to Slot Pulse Generation Circuit 8. Based on the input UTC, Slot Pulse Generation Circuit 8 generates a slot reference pulse and supplies it to CPU 1.

Memory 9, which is made up of a storage medium permitting writing and updatable storage, comprises Slot Map 91, Overlapping Slot Memory 92, and Compilation/Analysis Memory 93. Here, Slot Map 91 corresponds to the "reserved slot storage unit" of the present invention, and Overlapping Slot Memory 92 corresponds to the "overlapping reserved slot storage unit" of the present invention.

Figure 2:
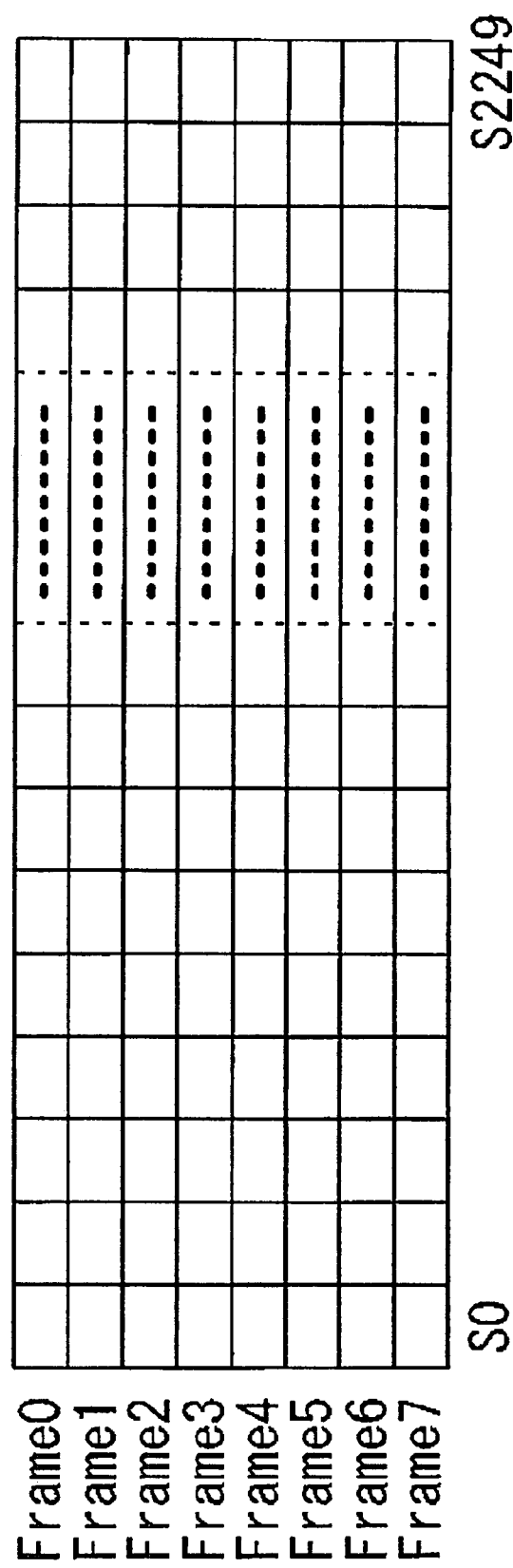
FIG. 2 is a diagram illustrating an example of Slot Map 91 shown in FIG. 1.

Slot Map 91 is constituted by a storage region such as the one shown in FIG. 2.

FIG. 2 is a diagram illustrating an example of Slot Map 91 shown in FIG. 1.

Slot Map 91 has a structure that stores reservation information for all the slots, which are obtained by time-dividing each of the frames Frame0-Frame7 respectively into 2250 slots, with all of the respective slots provided with addresses and having a predetermined storage capacity. Each AIS channel is equipped with Slot Map 91 such that, in the AIS apparatus illustrated in FIG. 1, there is a slot map used for Channel A and a slot map used for Channel B.

Figure 3:
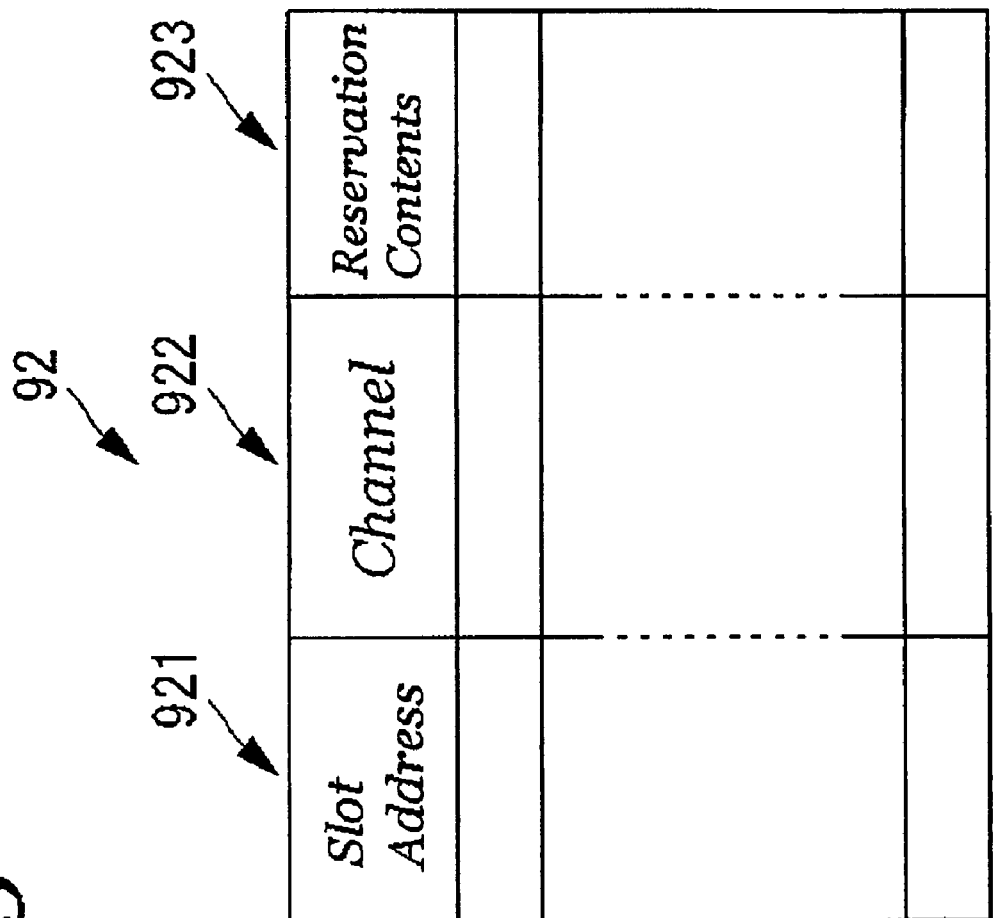
FIG. 3 is a diagram illustrating the configuration of Overlapping Slot Memory 92 shown in FIG. 1.

Overlapping Slot Memory 92 is constituted by a storage region such as the one shown in FIG. 3.

FIG. 3 is a diagram illustrating the configuration of Overlapping Slot Memory 92 shown in FIG. 1.

Overlapping Slot Memory 92 comprises Slot Address Storage Section 921, which stores the addresses of overlapped slots, Channel Storage Section 922, which stores the channels of the overlapping slots, and Reservation Contents Storage Section 923, which stores information on the stations that made the respective reservations. Slot Address Storage Section 921, Channel Storage Section 922, and Reservation Contents Storage Section 923 are linked with one another and can store information regarding which stations have made overlapping reservations for which slots. It should be noted that, as used herein, the term "slot address" does not mean simply a slot number, but a slot number including a frame number.

Compilation/Analysis Memory 93 is used when analyzing AIS messages and DSC commands received by CPU 1, as well as when compiling AIS messages and DSC response commands for transmission.

In the thus configured AIS communication apparatus, DSC communication signals are transmitted using the following control techniques.

(1) Technique for transmitting DSC response commands without interfering with transmission and receipt of scheduled AIS communication signals.

Figure 4:
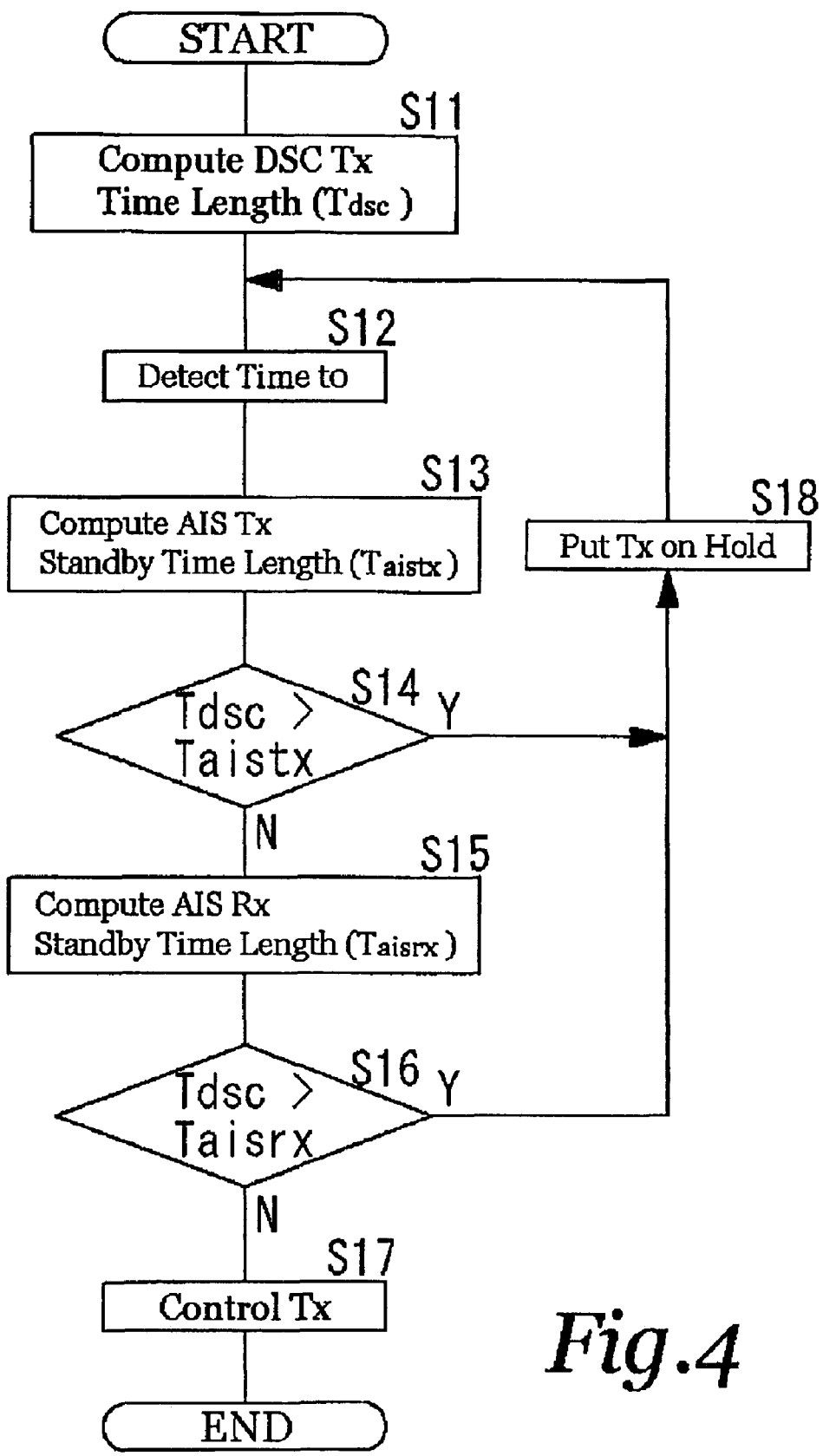
FIG. 4 is a flow chart illustrating a technique for transmitting DSC response signals without interfering with the transmission and receipt of scheduled AIS communication signals.

FIG. 4 is a flow chart illustrating a technique for transmitting DSC response signals without interfering with the transmission and receipt of scheduled AIS communication signals.

Figure 5:
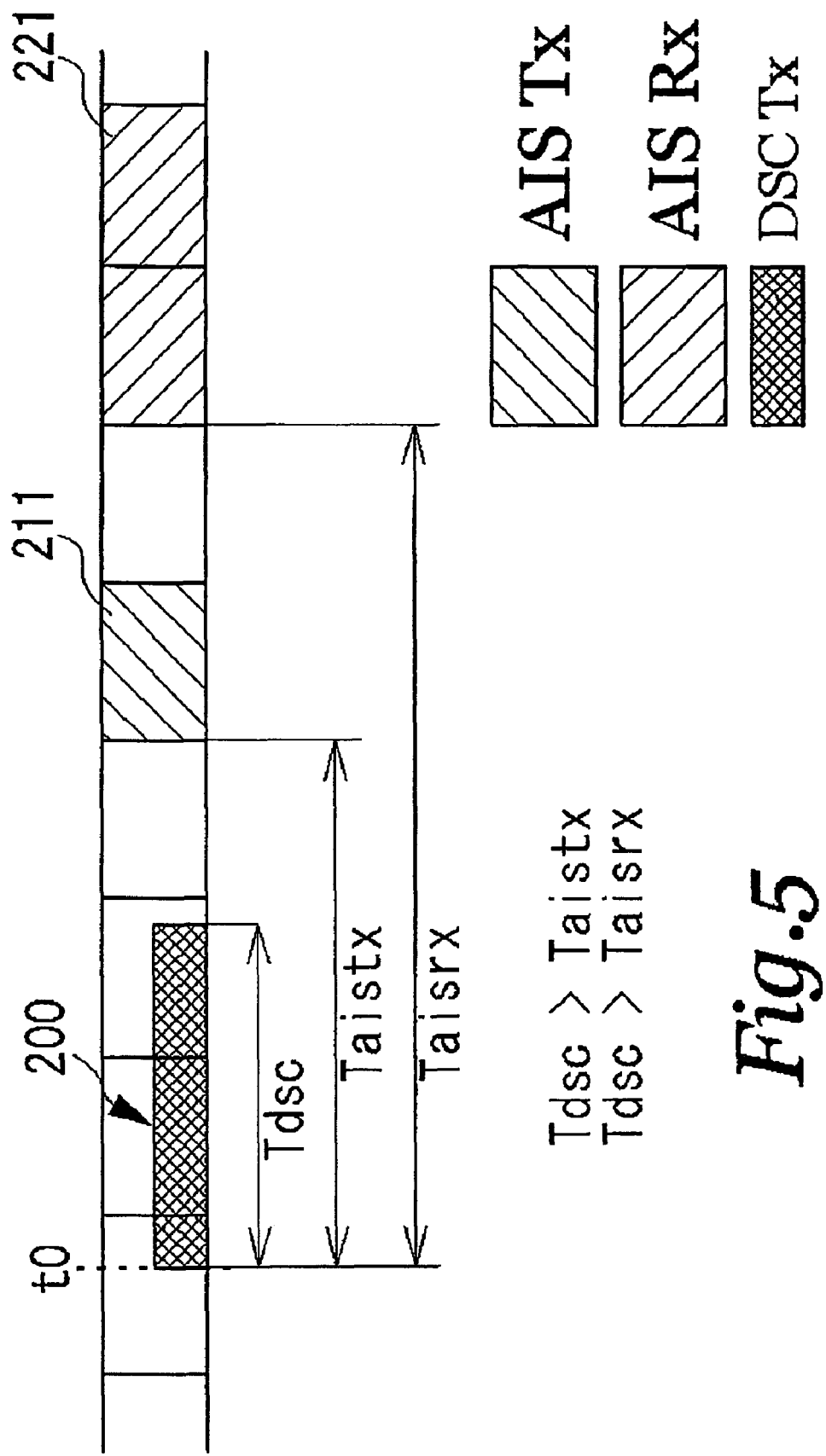
FIG. 5 is a schematic diagram illustrating a temporal relationship between DSC transmission and AIS transmission and reception.

In addition, FIG. 5 is a schematic diagram illustrating a temporal relationship between DSC transmission and AIS transmission and reception.

CPU 1 obtains a DSC command by analyzing a DSC communication signal received by DSC Receiver 4 and compiles a DSC response command.

When CPU 1 generates the DSC response command, it computes the amount of data in the response command and, based on the amount of data, computes a DSC transmission time length $T_{dsc}$, which is the time required for the transmission of the DSC response command (S11). Next, CPU 1 detects the present time $t_0$ using UTC etc. obtained from GPS Receiver 7 (S12). Upon detection of the current time $t_0$, CPU 1 reads the next Slot Reserved for AIS Transmission 211 from Slot Map 91 and detects the time of the start timing of the next Slot Reserved for AIS Transmission 211. CPU 1 subtracts the current time $t_0$ from the detected time of the start timing to compute an AIS transmission standby time length $T_{aistx}$, which is the time $t_0$ the next AIS transmission timing (S13).

CPU 1 compares the DSC transmission time length $T_{dsc}$ with the AIS transmission standby time length $T_{aistx}$ and, if it detects that the DSC transmission time length $T_{dsc}$ is longer (S14), puts the DSC transmission on hold (S18). Subsequently, after a predetermined time, the detection of the current time $t_0$ and computation of the AIS transmission standby time length $T_{aistx}$ are carried out again.

On the other hand, if CPU 1 detects that the DSC transmission time length $T_{dsc}$ is shorter than the AIS transmission standby time length $T_{aistx}$ (S14), it reads the next Slot Reserved For AIS Reception 221 from Slot Map 91 and detects the time of the start timing of the Slot Reserved For AIS Reception 221. CPU 1 subtracts the current time $t_0$ from the detected time of the start timing to compute an AIS reception standby time length $T_{aisrx}$, which is the time $t_0$ the next AIS reception timing (S15).

CPU 1 compares the DSC transmission time length $T_{dsc}$ with the AIS reception standby time length $T_{aisrx}$ and, if it detects that the DSC transmission time length $T_{dsc}$ is longer (S16), puts the DSC transmission on hold (S18). Subsequently, after a predetermined time, the detection of the current time $t_0$ and computation of the AIS transmission standby time length $T_{aistx}$ are carried out again.

On the other hand, if CPU 1 detects that the DSC transmission time length $T_{dsc}$ is shorter than the AIS reception standby time length $T_{aisrx}$ (S16), it effects transmission control over Transmitter 2 (S17).

As a result of performing such processing, when CPU 1 is about to effect transmission of a DSC response command, it can prevent AIS transmission and AIS reception from overlapping by checking Slot Map 91. Accordingly, DSC transmission can be performed without impairing AIS transmission and reception.

It should be noted that although in this embodiment the AIS transmission standby time length $T_{aistx}$ and AIS reception standby time length $T_{aisrx}$ were calculated separately and then respectively compared with the DSC transmission time length $T_{dsc}$, the AIS transmission standby time length $T_{aistx}$ and AIS reception standby time length $T_{aisrx}$ may be calculated simultaneously and the shorter time length may be then compared with the DSC transmission time length $T_{dsc}$.

(2) Technique for avoiding suspension of transmission of DSC communication signals due to receipt of unscheduled AIS communication signals.

Figure 6:
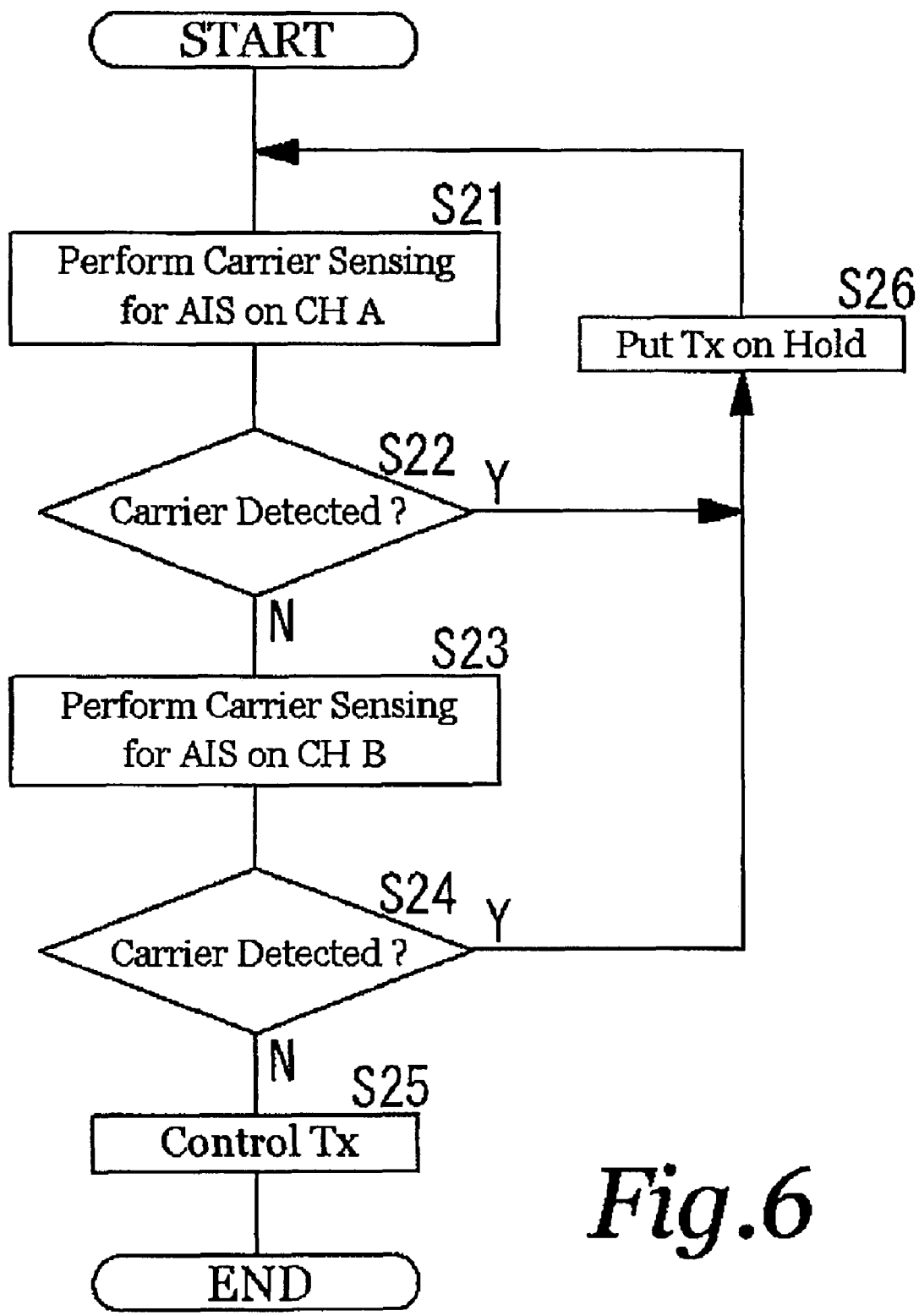
FIG. 6 is a flow chart illustrating a method used to transmit DSC response signals without interference from receipt of unscheduled AIS communication signals.

FIG. 6 is a flow chart illustrating a method used to transmit DSC response signals without interference from receipt of unscheduled AIS communication signals.

Additionally, FIG. 7 is a schematic diagram illustrating carrier sense timing.

As described above, when a DSC response command is generated, CPU 1 effects command control over AIS Carrier Detection Circuit 51 of AIS Receiver 5 to detect, using the timing illustrated in FIG. 7, whether a Channel A AIS communication signal is being received. In accordance with this command control, AIS Carrier Detection Circuit 51 performs Carrier sensing during Carrier Detection Interval 901, i.e. a period of carrier detection time $T_{ks}$ whose starting point is a point obtained upon elapse of a carrier detection delay time $T_k$ from the slot timing of Slot 900 (S21). Specifically, AIS Carrier Detection Circuit 51 detects the amplitude level of signals inputted to the current AIS Receivers 5, detects the carrier signal by narrowing the pass band of the filter to the frequency of the carrier signal, detects the phase of, and demodulates, the AIS communication signals, and outputs them.

Here, the carrier detection delay time $T_k$ is set by using the waveform of AIS communication signals observed in the past to compute a point in time, at which an AIS communication signal exceeds a predetermined amplitude. In addition, the carrier detection time $T_{ks}$ is set based on the shortest time length of the AIS communication signals. If at such time the end point of Carrier Detection Interval 901, which is set based on the carrier detection delay time $T_k$ and carrier detection time $T_{ks}$, is close to the end of Slot 900, the end timing of the DSC transmission is also delayed. For this reason, there is a chance that the DSC transmission might overlap with another slot located farther back (in terms of time, in the delay direction) in comparison with a case, wherein a DSC transmission is performed from the vicinity of the top of the slot where the DSC transmission starts, and there might be another overlap with AIS transmission and reception. Therefore, it is expedient to set the carrier detection time $T_{ks}$ such that it is shorter in comparison with the slot length and set the end point of Carrier Detection Interval 901 with a delay, at a point delayed at a maximum by about half of the slot length from the slot timing (start timing) of said slot.

When the carrier of the AIS communication signal is detected (S22), CPU 1 puts the DSC transmission on hold (S26).

On the other hand, if the carrier of the AIS communication signal is not detected (S22), CPU 1 effects command control over AIS Carrier Detection Circuit 61 of AIS Receivers 6 to detect, using the same method as in case of Channel A, whether a Channel B AIS communication signal is being received. In accordance with this command control, AIS Carrier Detection Circuit 61 performs carrier sensing during Carrier Detection Interval 901 (S23). If the carrier of the AIS communication signal is detected (S24), CPU 1 puts the DSC transmission on hold (S26). If the carrier of the AIS communication signal is not detected (S24), DSC transmission control is effected with respect to Transmitter 2 (S25).

As a result of performing such processing, even when an unscheduled AIS communication signal is received, DSC transmission during this AIS reception period can be put on hold by performing carrier sensing. This makes it possible to prevent suspension of DSC transmission due to receipt of an unscheduled AIS communication signal and, at the same time, prevent interference with the reception of the unscheduled AIS communication signal from the DSC transmission.

It should be noted that carrier sensing in Carrier Detection Interval 901 of each Slot 900 of each channel does not have to be performed multiple times and can be performed only once in each Carrier Detection Interval 901 of each channel. This permits speedy and reliable carrier sensing.

Moreover, although the explanations above centered on carrier sensing in case of AIS communication signals, since DSC Carrier Detection Circuit 41 is also provided in DSC Receiver 4, DSC carrier sensing may be performed using DSC Carrier Detection Circuit 41. This makes it possible to prevent suspension of DSC transmission due to DSC reception and interference with DSC reception due to DSC transmission.

Moreover, while this was not illustrated in detail in the explanations above, the technique described in (2) can be implemented in combination with the technique described in (1) above. This enables DSC transmission while avoiding conflicts between DSC transmission and AIS transmission/reception in a more reliable manner.

(3) Transmission control technique used when reserved slots overlap

Figure 8:
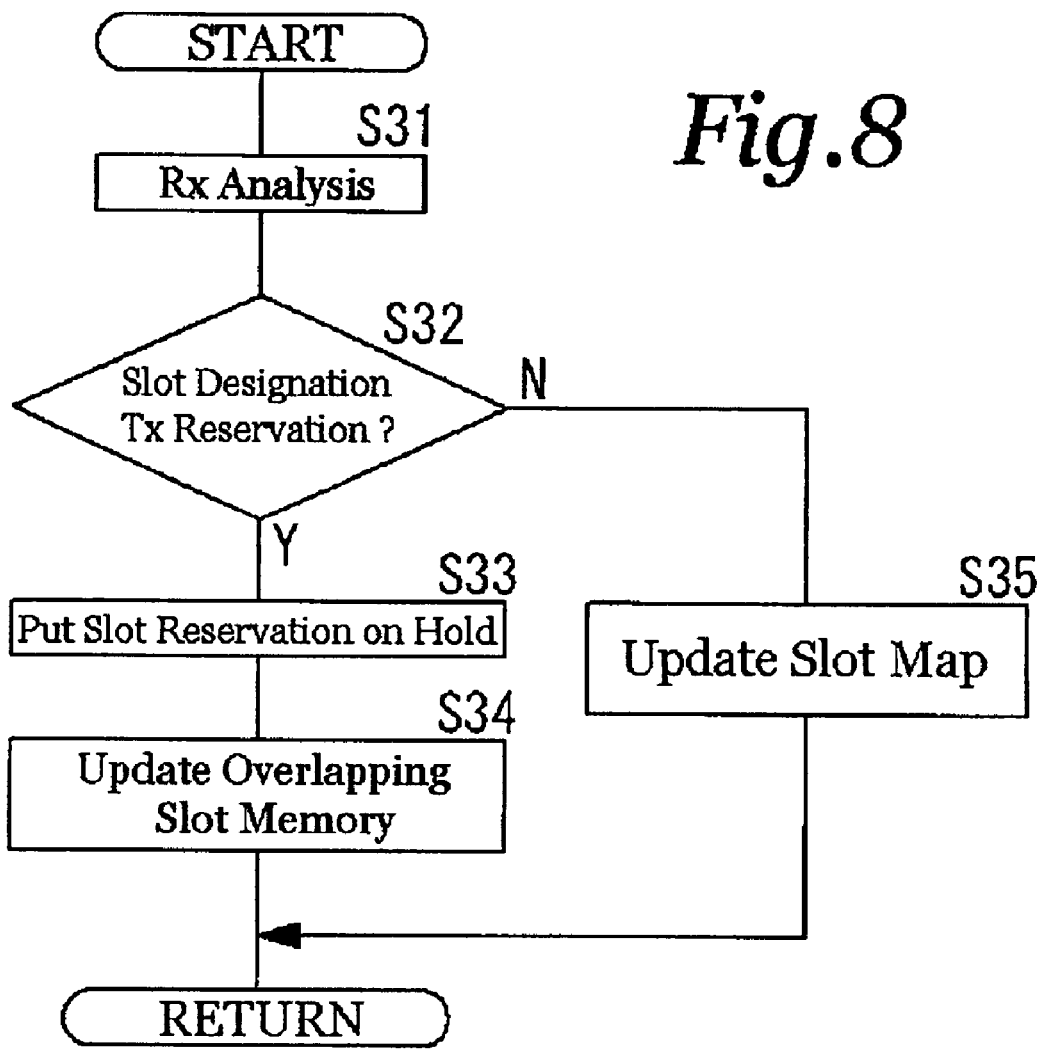
FIG. 8 is a flow chart illustrating a reception control technique used when reserved slots overlap.

FIG. 8 is a flow chart illustrating a reception control technique used when reserved slots overlap.

Figure 9:
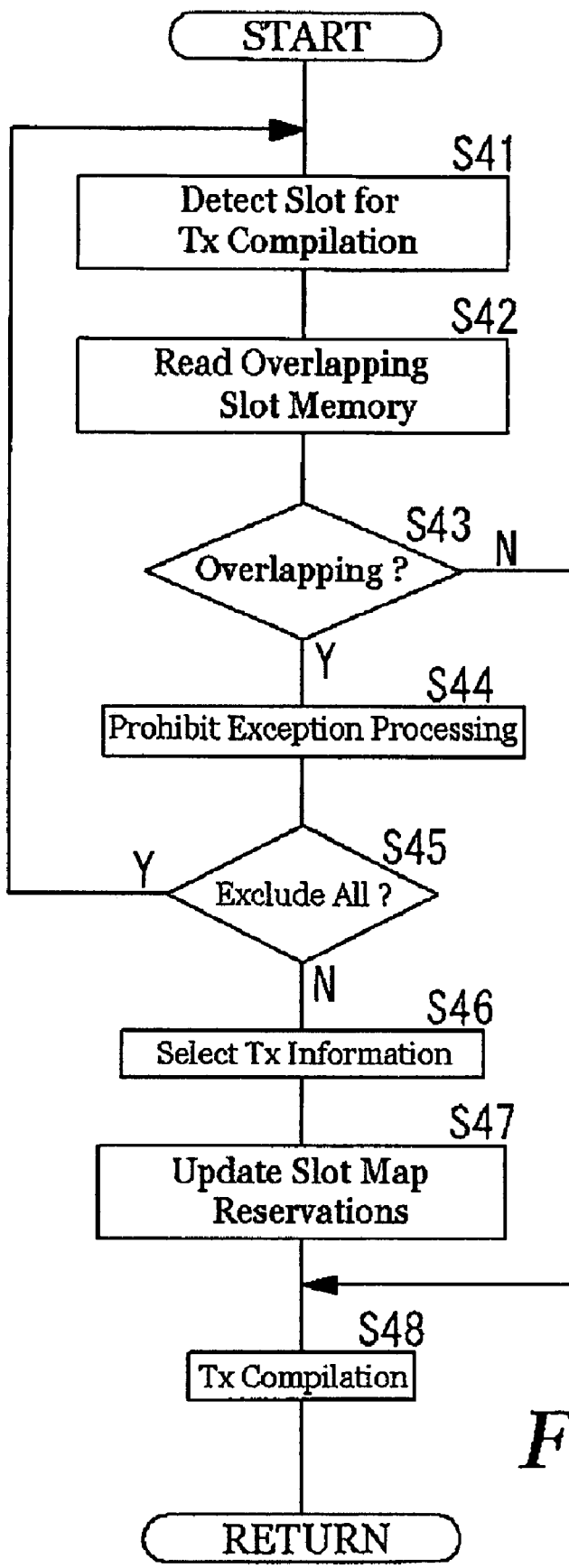
FIG. 9 is a flow chart illustrating a transmission control technique used when reserved slots overlap.

FIG. 9 is a flow chart illustrating a transmission control technique used when reserved slots overlap.

Figure 10:
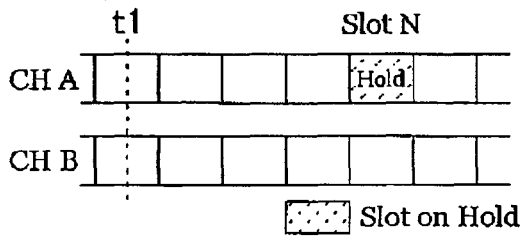
FIG. 10 is an explanatory diagram used to explain the flows illustrated in FIG. 8 and FIG. 9.
Figure 10:
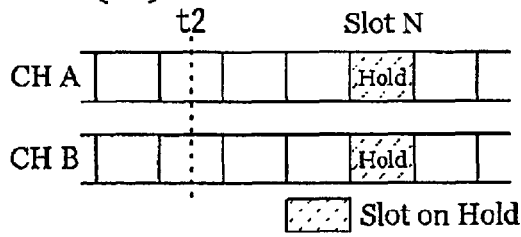
Figure 10:
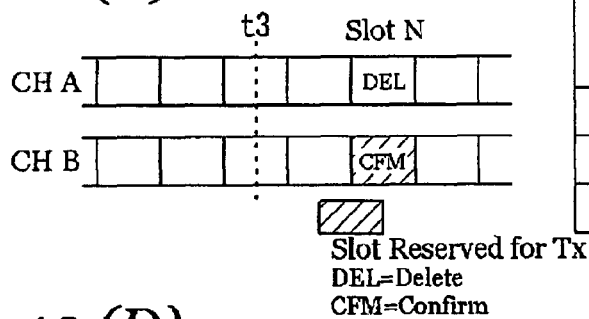
Figure 10:
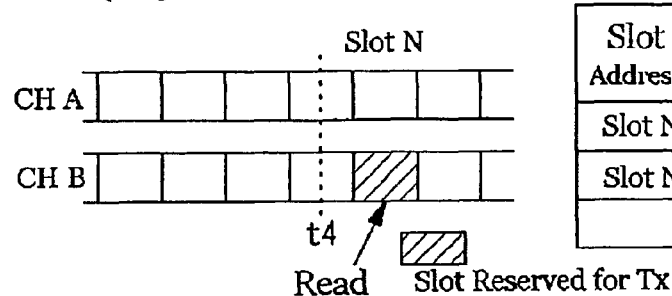

FIG. 10 is an explanatory diagram used to explain the flows illustrated in FIG. 8 and FIG. 9. In FIGS. 10, 10(A) to 10(D) are arranged along a timeline, illustrating the state of reservation in Slot Map 91 and the state of storage in Overlapping Slot Memory 92.

(3-1) Reception processing used when slots reserved for transmission overlap

CPU 1 analyzes an AIS message from another station demodulated by AIS Receivers 5, 6 to detect transmission slot reservation information (S31). CPU 1 further analyzes the detected transmission slot reservation information and determines whether this transmission reservation information is of the slot designation type used by a base station (S32). As used herein, the term "transmission reservation of slot designation type" refers to a transmission reservation with transmission slots at one's own station being designated by another station, such as a base station. If the transmission slot reservation information is not of the slot designation type, CPU 1 stores a transmission reservation in the corresponding slot of Slot Map 91 (S35). On the other hand, if the transmission slot reservation information is of the slot designation type, CPU 1 put the transmission reservation of the corresponding slot in Slot Map 91 on hold (S33) and stores overlapping slot information in Overlapping Slot Memory 92 (S34).

As an example, a case of overlapping transmission reservations of the slot designation type will be now explained with reference to FIGS. 10(A) and 10(B). First of all, when an AIS message containing a transmission reservation for transmission in slot N of Channel A is received from a base station X at time $t_1$, CPU 1 analyzes the AIS message. At such time, CPU 1 detects that this transmission reservation is a transmission reservation of the slot designation type from base station X and puts the transmission reservation in slot N of Slot Map 91 on hold for Channel A. At the same time, CPU 1 stores information on the fact that a transmission reservation has been made by base station X in slot N of Channel A in Overlapping Slot Memory 92.

Next, when an AIS message containing a transmission reservation for transmission in slot N of Channel B is received from a base station Y at time $t_2$ (a later time relative to time $t_1$), CPU 1 analyzes the AIS message. At such time, CPU 1 detects that this transmission reservation is a transmission reservation of the slot designation type from base station Y and puts transmission reservation in slot N of Slot Map 91 on hold for Channel B. At the same time, CPU 1 stores information on the fact that a transmission reservation has been made by base station Y in slot N of Channel B in Overlapping Slot Memory 92.

(3-2) Transmission processing used when slots reserved for transmission overlap

Upon arrival of a predetermined timing (time t3) obtained by going back a predetermined time from the target slot, CPU 1 reads Slot Map 91 and detects whether there is a transmission reservation for a slot to be used for transmission compilation (S41). At the same time, CPU 1 reads Overlapping Slot Memory 92 and detects whether there is overlapping slot information in in the slot to be used for transmission compilation (S42). If no overlapping slot information in is detected, namely, if it is detected that a transmission reservation is present, but there is no overlapping slot information in in the slot to be used for transmission compilation, CPU 1 performs transmission compilation (S43?S48).

On the other hand, if information on overlapping is detected, prohibition exception processing is carried out (S43→S44). As used herein, the term "prohibition exception processing" refers to the use of instructions related to suspension and prohibition of transmission, as configured by a base station, in order to determine whether contents scheduled for transmission satisfy prohibition conditions. As an example of instructions by a base station, there are cases in which, for instance, transmission on Channel A or Channel B is prohibited after transmission reservations are made.

CPU 1 verifies the contents of each transmission reservation based on the prohibition conditions and transmission reservations that satisfy the prohibition conditions are excluded. If all the transmission reservations satisfy the prohibition conditions at such time, all the transmission reservations are cancelled, and the next slot to be used for transmission is detected (S45→S41). Here, transmission processing is subsequently carried out if any transmission reservations remain.

CPU 1 analyzes the transmission reservations that do not satisfy the prohibition conditions and selects transmission reservations in accordance with the existing UAIS rule regarding the prohibition of overlapping. For instance, when there are two transmission reservations for the same slot, the transmission reservation that is made earlier is selected (S46). CPU 1 updates Slot Map 91 in accordance with the selected transmission reservations (S47).

Then, immediately prior to the corresponding slot (time $t_4$), CPU 1 reads Slot Map 91, which contains established transmission reservations, and performs the compilation of an AIS message for transmission (S48).

By determining the transmitted signals immediately prior to transmission in this manner, non-prohibited transmission reservations are executed even if transmission reservations are made by different base stations for the same slot and later some of them are prohibited. As a result, if, for instance, a vessel navigates through a boundary area covered by different base stations and a first base station makes a transmission reservation followed by a transmission reservation for the same slot by another base station, and, also, if the use of the transmission frequency based on the original base station is prohibited in the other base station, the transmission reservation made by the other base station is adopted. As a result, in the past, both transmission reservations would have been cancelled, but in the present invention, the non-prohibited transmission reservation is carried out and transmission reservations from both base stations are no longer ignored at the same time.

(4) Technique for stabilizing oscillation frequency

Figure 11:
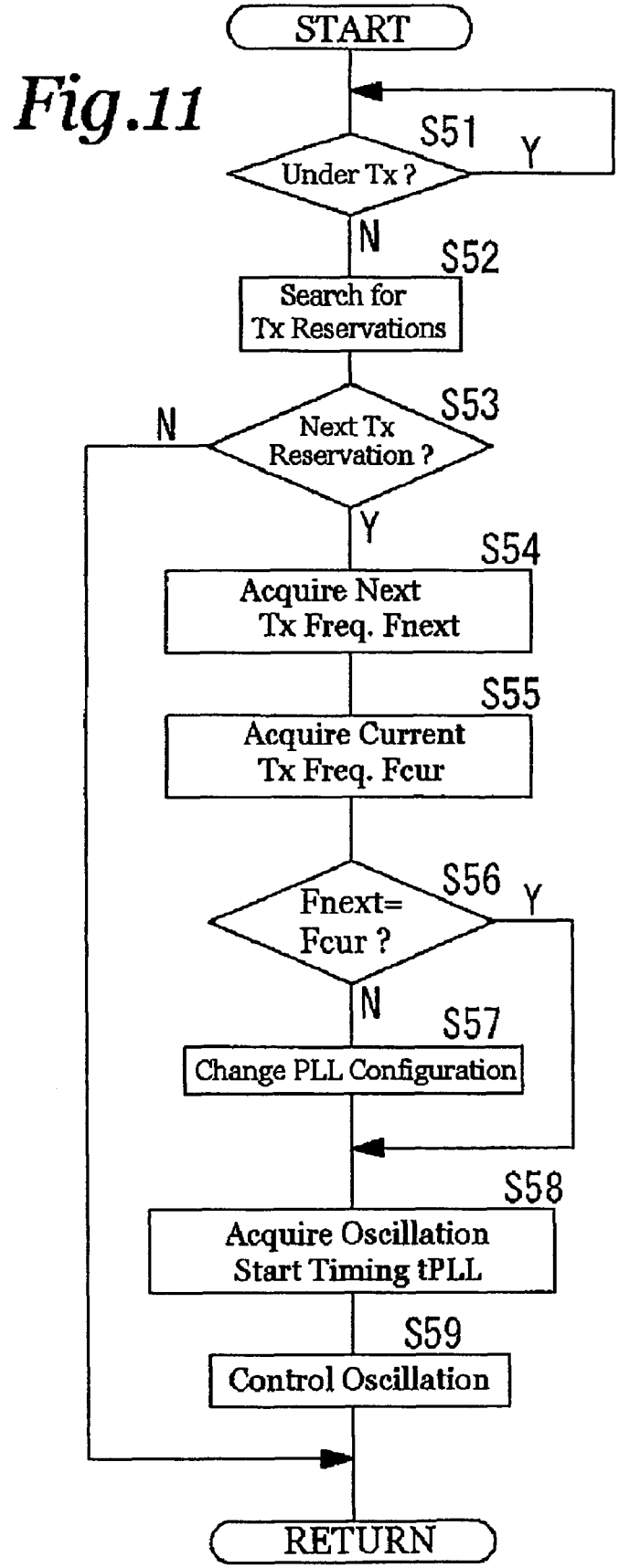
FIG. 11 is a flow chart illustrating an oscillator frequency control technique.

FIG. 11 is a flow chart illustrating an oscillator frequency control technique.

Figure 12:
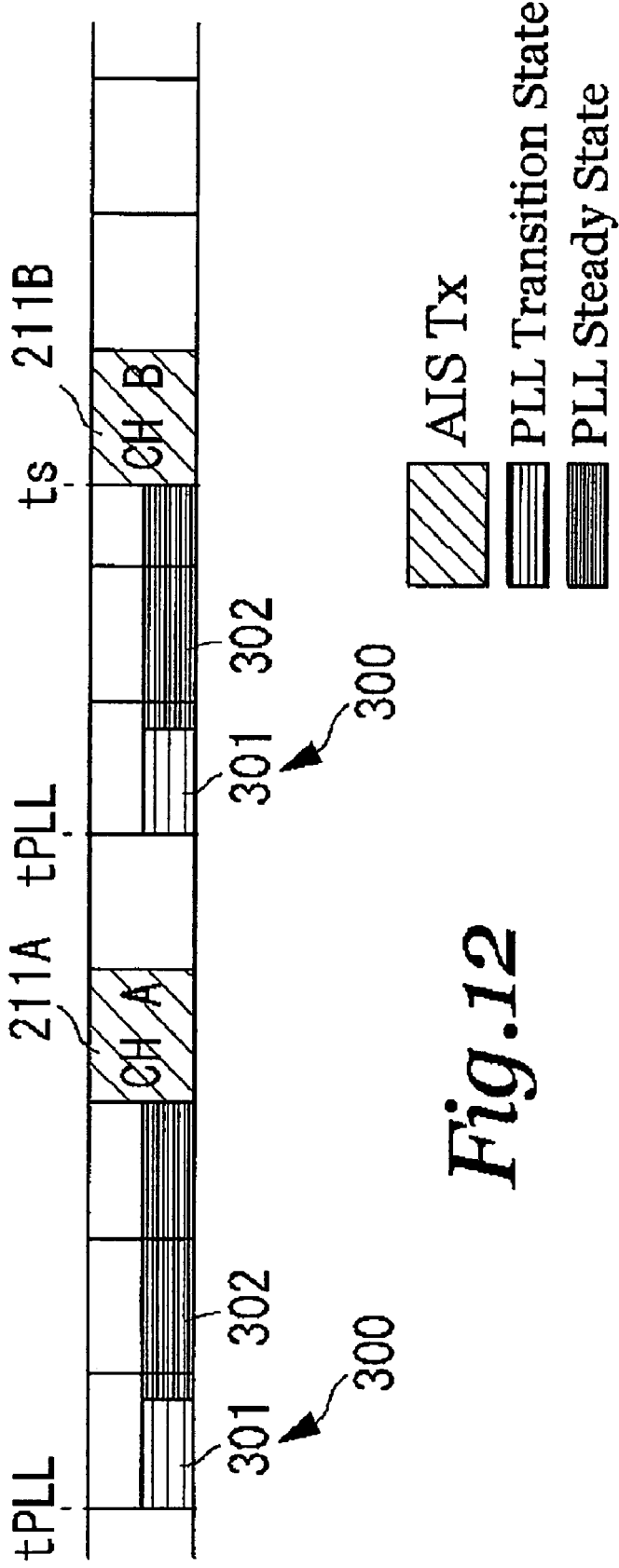
FIG. 12 is an explanatory diagram used to explain the flow illustrated in FIG. 11.
Figure 13:
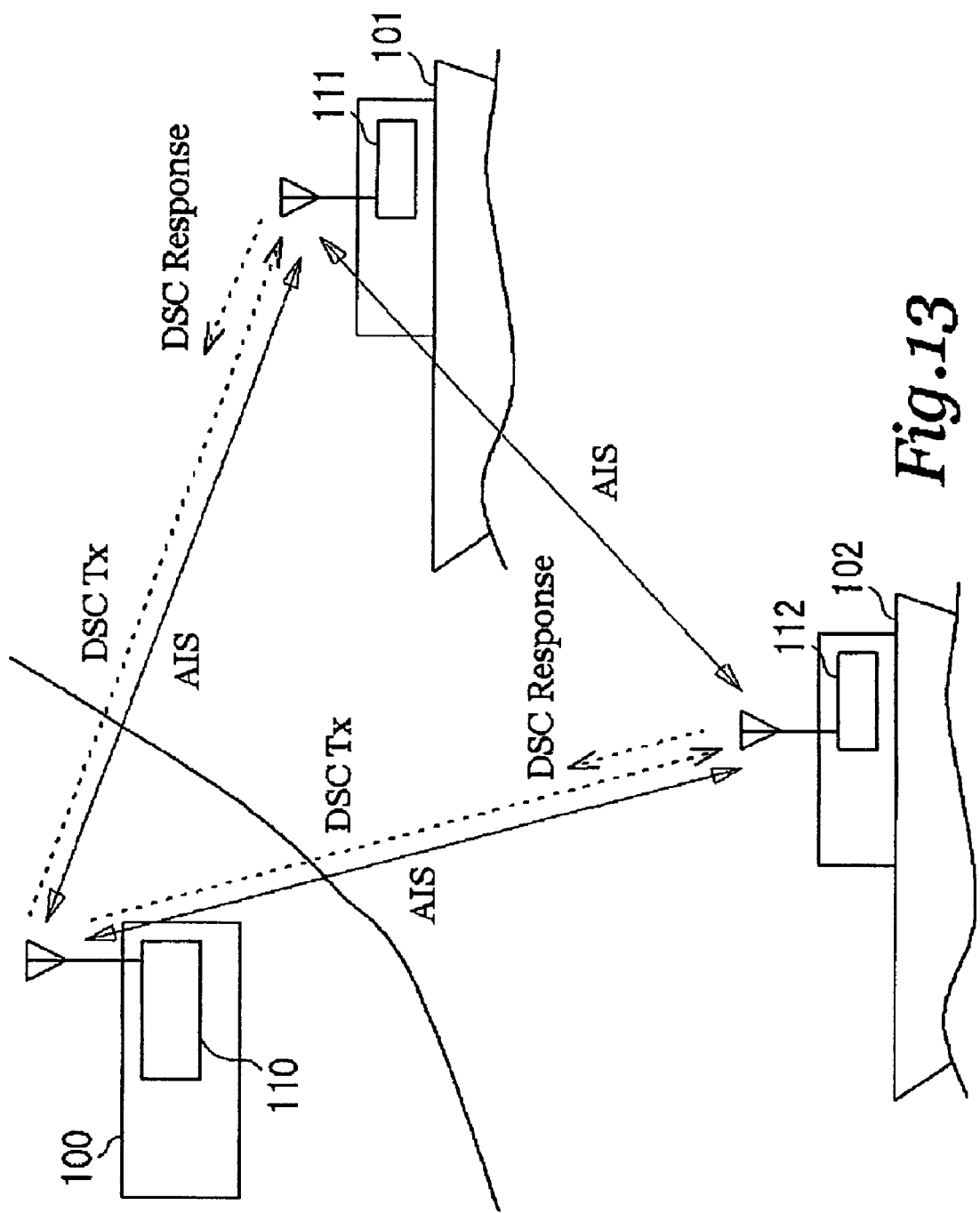
FIG. 13 is a schematic diagram illustrating TDMA communications between a base station and a vessel using the UAIS.
Figure 14:
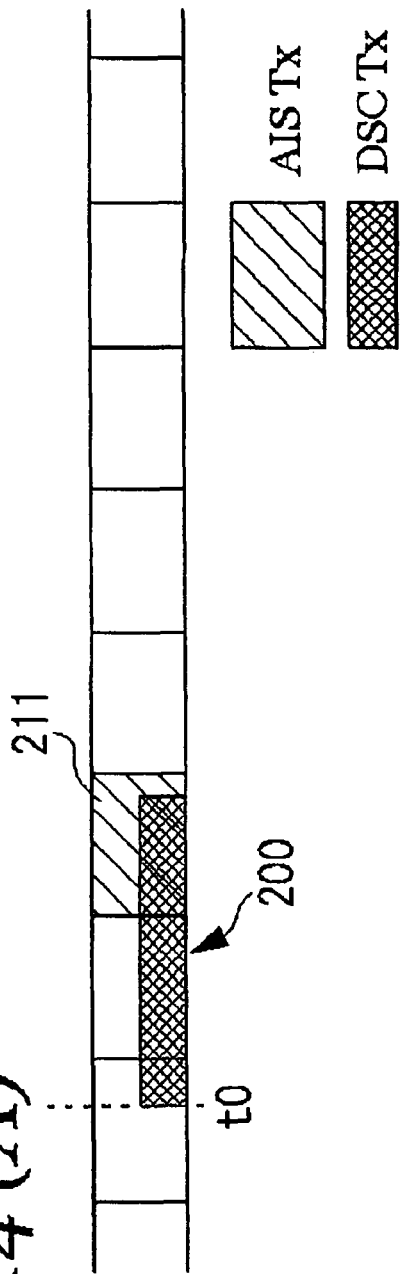
FIG. 14 is a schematic diagram illustrating a situation, in which slots reserved for AIS communication overlap during a DSC transmission.
Figure 14:
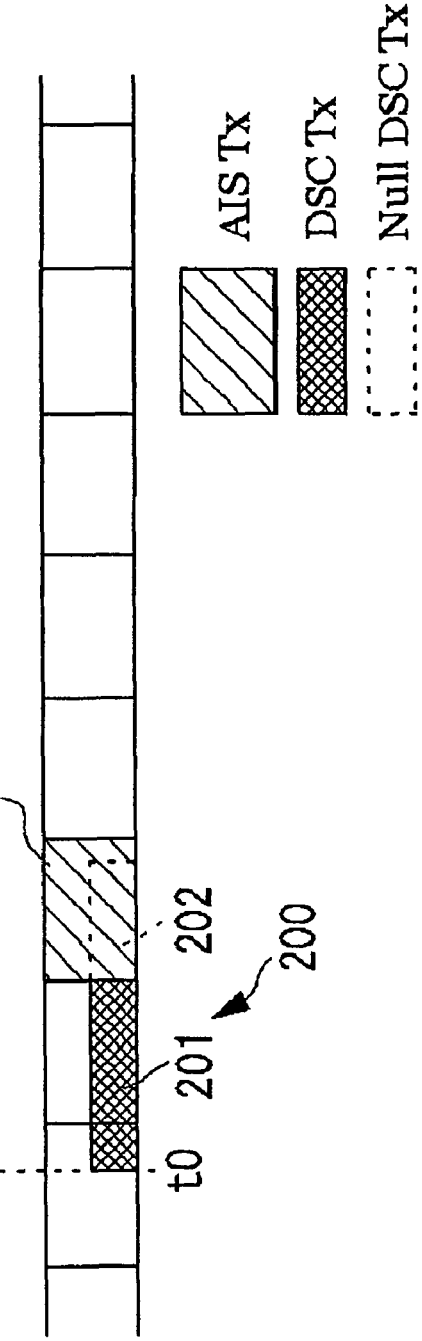
Figure 16:
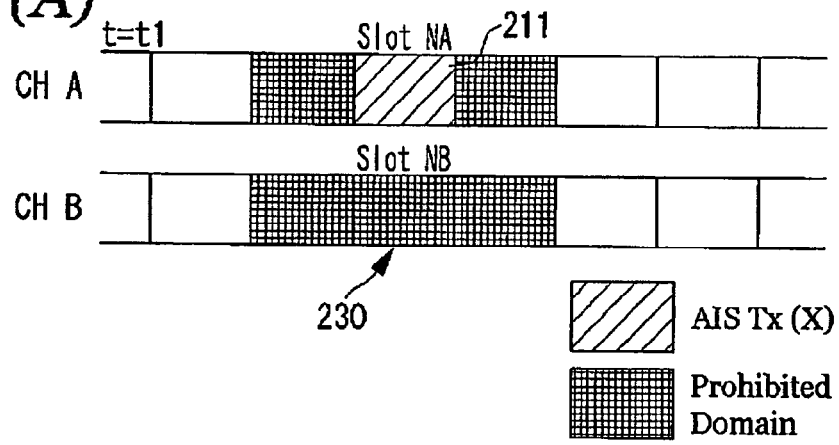
FIG. 16 is a schematic diagram illustrating a situation, wherein transmission becomes impossible due to overlapping of AIS transmission reservations at the same station.
Figure 16:
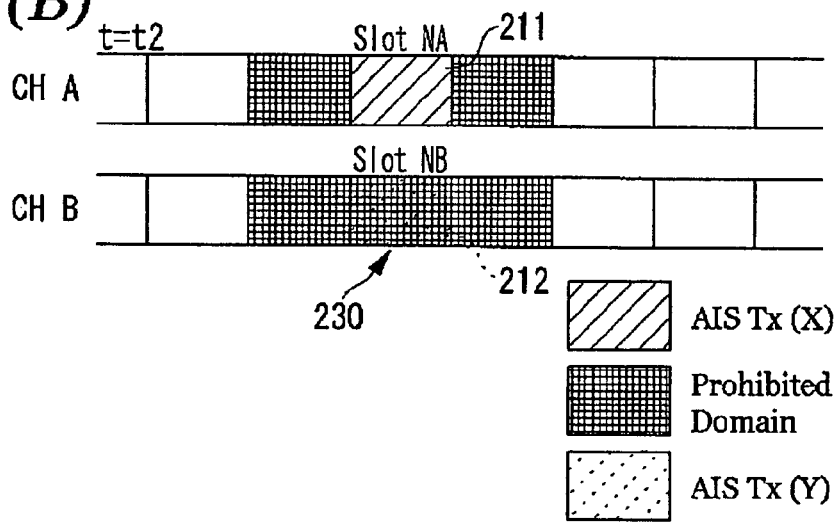
Figure 16:
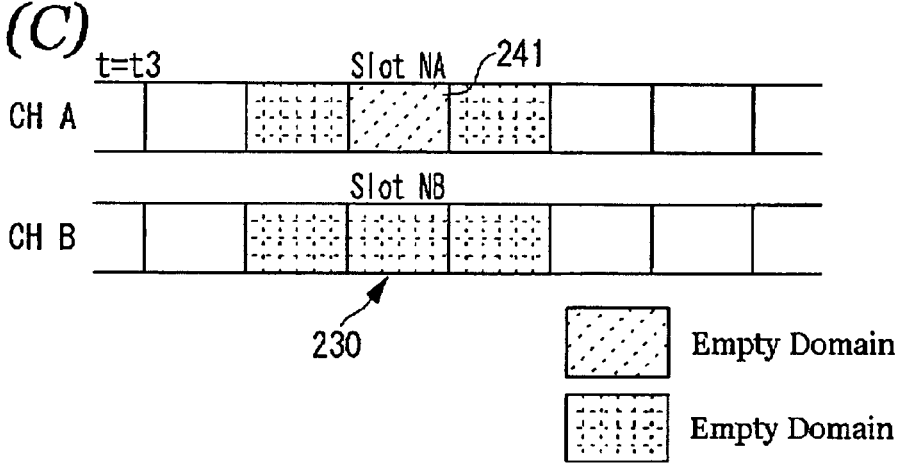

FIG. 12 is an explanatory diagram used to explain the flow illustrated in FIG. 11.

CPU 1 uses preset prescribed timing to detect whether transmission is currently underway and, if it is, repeats detection until the transmission is over (S51). When it detects that its own station no longer transmits, CPU 1 reads Slot Map 91 in search of the next transmission reservation (the present station) (S52). Subsequently, when the next transmission reservation is detected, it detects whether the next transmission will take place on Channel A or Channel B and acquires a next transmission oscillation frequency Fnext (S53?S54). Along with acquiring the next transmission oscillation frequency Fnext, CPU 1 acquires the current oscillation frequency Fcur. Here, the "current oscillation frequency Fcur" is an oscillation frequency based on the current PLL configuration, and specifically, the oscillation frequency used for the previous transmission. CPU 1 then compares the next transmission oscillation frequency Fnext with the current oscillation frequency Fcur (S56) and, if the next transmission oscillation frequency Fnext is different from the current oscillation frequency Fcur, changes the PLL configuration of Transmission Frequency Generation Circuit 21 of Transmitter 2-(S57).

CPU 1 then acquires the timing of the next slot to be used for transmission from Slot Map 91 and acquires a PLL startup timing $_tPLL$, which is obtained by shifting the time of the slot timing to an earlier time, with respect to the above timing as reference, by a preset oscillation setup time (S58). Here, the oscillation setup time is set by adding a predetermined time margin (e.g. time sufficient for about two slots, as shown in FIG. 12) to the time from operation start to stable operation of Transmission Frequency Generation Circuit 21. Then, if the present moment has not reached the PLL startup timing $_tPLL$, CPU 1 temporarily puts oscillation control on hold, and, if it has reached the PLL startup timing $_tPLL$, effects oscillation control (S59).

The operation will be explained specifically with reference to FIG. 12. For example, if an AIS transmission (Channel A) corresponding to Transmission Reservation 211A is underway at the present moment, CPU 1 detects it and waits for the transmission to end. When CPU 1 detects that the AIS transmission of Transmission Reservation 211A is over, it reads Slot Map 91 and detects an AIS transmission (Channel B) corresponding to Transmission Reservation 211B. CPU 1 detects that Transmission Reservation 211B is a transmission on Channel B and acquires the transmission frequency $F_{next}$ of Channel B. Simultaneously, CPU 1 detects that the previous transmission (corresponding to Transmission Reservation 211A) is a transmission on Channel A. CPU 1 then detects that their transmission frequencies are different and switches the PLL configuration of Transmission Frequency Generation Circuit 21 from Channel A to Channel B.

CPU 1 detects the PLL startup timing $_tPLL$ and effects oscillation control at this point in time. As a result of performing such processing, transmission is initiated using the preset timing of Transmission Reservation 211B. Incidentally, in some cases, the slot timing of Transmission Reservation 211B is subjected to time synchronization, as shown in FIG. 12. In such a case, the slot timing is typically moved to an earlier time in comparison with that before the synchronization. For this reason, the slot length (slot duration) immediately prior to Transmission Reservation 211B becomes shorter. However, as a result of setting the PLL startup timing $_tPLL$ with a predetermined margin as described above, even if the slot timing moves to an earlier time, the slot timing of the slot reserved for transmission does not arrive during the PLL transition state and transmission can be initiated when the PLL is in the steady state.

As a result of performing such processing, even if the slot timing moves to an earlier time as a result of the synchronization, signals of predetermined transmission frequencies can be generated in a stable manner.

It should be noted that although the explanations above centered on PLL control over AIS transmission, the same can be applied to DSC transmission. In such a case, DSC transmissions can be configured by adding the time from the PLL startup timing $_tPLL$ to the DSC transmission start timing to the DSC transmission time $T_{dsc}$ described in (1) above.

Although, as described above, the PLL startup timing is matched with the AIS start timing, there is no particular need for the PLL startup timing to coincide with the AIS slot timing and it can be configured in a discretionary manner.

INDUSTRIAL APPLICABILITY

As described above, the present invention applies to TDMA communication apparatuses communicating AIS (Automatic Identification System) information signals in TDMA mode and, in particular, applies to TDMA communication apparatuses communicating using AIS and DSC (Digital Selective Calls).

The invention claimed is:
1. A Time Division Multiple Access (TDMA) communication apparatus that, by allocating a plurality of slots to a single frame in a time-divided manner, effects transmission of a first communication signal during slots reserved by communicating stations by performing respective slot synchronization and, along with that, effects transmission of a second communication signal without the slot synchronization being performed, the apparatus comprising:
  a reserved slot storage unit that stores reserved slots for each of the stations,
  an overlapping reserved slot storage unit that stores corresponding slots as overlapping reserved slots when the present station's transmission is subject to reservation by another station, and
  a control unit that, along with computing a transmission time length for the second communication signal being transmitted,
  computes a standby time length from the present time until the time of receipt of the first communication signal or the time of transmission of the next first communication signal read from the reserved slot storage unit,
  effects transmission control over the second communication signal if the transmission time length is detected to be shorter than the standby time length,
  holds the second communication signal pending if the transmission time length is detected to be longer than the standby time length, and
  wherein at the timing when compilation starts for the overlapping reserved slots, the control unit selects a signal transmitted during the overlapping reserved slots based on information from the overlapping reserved slot storage unit.

2. The TDMA communication apparatus according to claim 1, comprising a receipt detection unit that detects receipt of the first communication signal,
  wherein the control unit effects transmission control over the second communication signal when it is determined that the receipt detection unit has not detected receipt of the first communication signal.

3. The TDMA communication apparatus according to claim 2, wherein the receipt detection unit detects receipt using timing delayed from the slot start timing by a predetermined time within the same slot.

4. The TDMA communication apparatus according to claim 1, wherein the first communication signal is an Automatic Identification System (AIS) signal and the second communication signal is a Digital Selective Calls (DSC) signal.

5. A Time Division Multiple Access (TDMA) communication apparatus that, by allocating a plurality of slots to a single frame in a time-divided manner, effects transmission of a first communication signal during slots reserved by communicating stations by performing respective slot synchronization and, along with that, effects transmission of a second communication signal without the slot synchronization being performed, the apparatus comprising:
  a reserved slot storage unit that stores reserved slots for each of the stations, and
  a control unit that, along with computing a transmission time length for the second communication signal being transmitted,
  computes a standby time length from the present time until the time of receipt of the first communication signal or the time of transmission of the next first communication signal read from the reserved slot storage unit,
  effects transmission control over the second communication signal if the transmission time length is detected to be shorter than the standby time length,
  holds the second communication signal pending if the transmission time length is detected to be longer than the standby time length, and
  wherein the control unit effects operation initiation control over a transmission reference frequency generation unit using a slot start timing moved back by a predetermined number of slots and the oscillation stabilization time of the transmission reference frequency generation unit from a transmission start timing of the first communication signal and second communication signal.

6. The TDMA communication apparatus according to claim 5, comprising a receipt detection unit that detects receipt of the first communication signal, wherein the control unit effects transmission control over the second communication signal when it is determined that the receipt detection unit has not detected receipt of the first communication signal.

7. The TDMA communication apparatus according to claim 6, wherein the receipt detection unit detects receipt using timing delayed from the slot start timing by a predetermined time within the same slot.

8. The TDMA communication apparatus according to claim 5, wherein the first communication signal is an Automatic Identification System (AIS) signal and the second communication signal is a Digital Selective Calls (DSC) signal.

\* \* \* \* \*